Aug. 18, 1959 C. S. REIS 2,900,522

SOLID STATE NETWORK

Filed Jan. 8, 1957 3 Sheets-Sheet 1

INVENTOR.
Charles S. Reis

BY

Flehr & Swain
ATTORNEYS

Aug. 18, 1959 C. S. REIS 2,900,522

SOLID STATE NETWORK

Filed Jan. 8, 1957 3 Sheets-Sheet 2

INVENTOR.
Charles S. Reis

BY [signature]

ATTORNEYS

Aug. 18, 1959 C. S. REIS 2,900,522

SOLID STATE NETWORK

Filed Jan. 8, 1957 3 Sheets-Sheet 3

INVENTOR.
Charles S. Reis
BY
[signature]
ATTORNES

United States Patent Office 2,900,522

Patented Aug. 18, 1959

2,900,522

SOLID STATE NETWORK

Charles S. Reis, Mountain View, Calif., assignor to Hewlett-Packard Company, Palo Alto, Calif., a corporation of California Application January 8, 1957, Serial No. 633,025

6 Claims. (Cl. 250—208)

This invention relates generally to a solid state network, and more particularly to a solid state network suitable for switching, counting, storage of information and the like.

It is a general object of the present invention to provide a solid state network which serves to count pulses applied thereto.

It is another object of the present invention to provide a solid state network which serves to switch in response to pulses applied thereto.

It is another object of the present invention to provide a network which comprises electroluminescent and photoconductive transducers arranged in a predetermined manner and which serve to count input pulses.

It is still another object of the present invention to provide a solid state network which comprises electroluminescent and photoconductive transducers arranged in a predetermined manner whereby they serve to sequentially switch in response to pulses.

It is still another object of the present invention to provide a solid state network which comprises an electroluminescent and photoconductive network in which light coupling between the elements serves to control the operation of the device.

It is still a further object of the present invention to provide a solid state network which comprises a plurality of units each including electroluminescent and photoconductive elements and arranged in a predetermined manner whereby suitable light coupling between the units serves to precondition each of the units whereby input pulse may be counted.

These and other objects of the invention will become more apparent from the following description and accompanying drawing.

Referring to the drawing.

Basically, the network comprises electroluminescent and photoconductive transducers arranged in a predetermined manner and connected to form a plurality of units. The network includes means for applying a bias signal to the various units. Each of the units is adapted to be preconditioned by light coupling whereby it is energized in response to an input pulse and remains energized by the bias signal until the next pulse is applied thereto.

Figure 1:
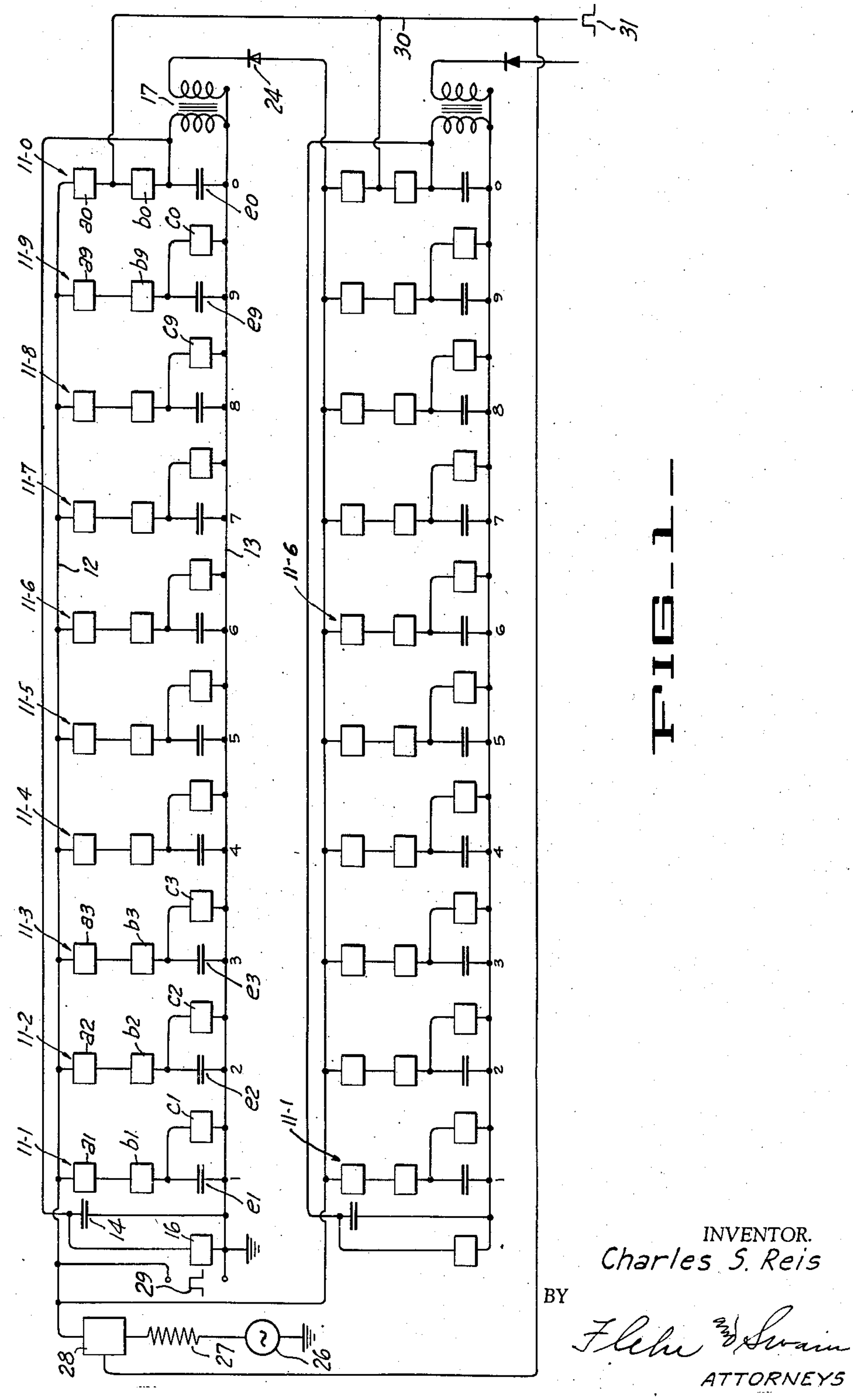
Figure 1 is a schematic diagram of a solid state network constructed in accordance with the invention.

Referring to Figure 1, a pair of solid state decade counters is connected to form a counter suitable to counting to 99. As is apparent, more decades may be cascaded to obtain higher counts.

Each of the decades comprises a plurality of identical units 11 (11–0 to 11–9) connected between the lines 12 and 13. Each of the units 11 comprises serially connected photoconductive cells *a*, *b*, *c*, with an electroluminescent cell *e* connected in shunt with the cell *c*. Hereinafter in the description subscripts will be employed to designate the cell of a particular unit of the decade counter. The electroluminescent cell 14 and photoconductive cell 16 are light coupled to the photoconductive cell $a_1$ and electroluminescent cell $e_1$ of unit 11–1, respectively. The cells 14 and 16 are connected in a parallel between the common junction of the photoconductive transducer $b_0$ and the electroluminescent transducer $e_0$. The primary of the transformer 17 is also connected between the line 13 and the common junction. The secondary of the transformer is connected to the line 12 of the second decade counter through diode 24.

A bias signal is applied between the lines 12 and 13 by the A.-C. generator 26. The signal may be applied through a current limiting resistor 27. As will be presently described, the bias signal has an amplitude which is sufficient to maintain any one of the units *e* energized if applied directly thereto.

Input pulses 29 are also applied between the lines 12 and 13. These pulses are generated in response to the event to be counted and have a predetermined amplitude which is sufficient to initially excite any one of the electroluminescent cells *e* when the respective unit 11 has been preconditioned, as will be presently described.

Reset pulses are applied to the apparatus along the line 30 which is connected with the junction of the photoconductive cells $a_0$ and $b_0$ of each of the units. The reset pulse 31 serves to momentarily open the gate 28 whereby the bias voltage is removed and to simultaneously energize the electroluminescent cell $e_0$ of the units 11–0. The count on the decades is then "zero" and the units 11–1 are preconditioned.

Figures 2, 3, 4, 5:
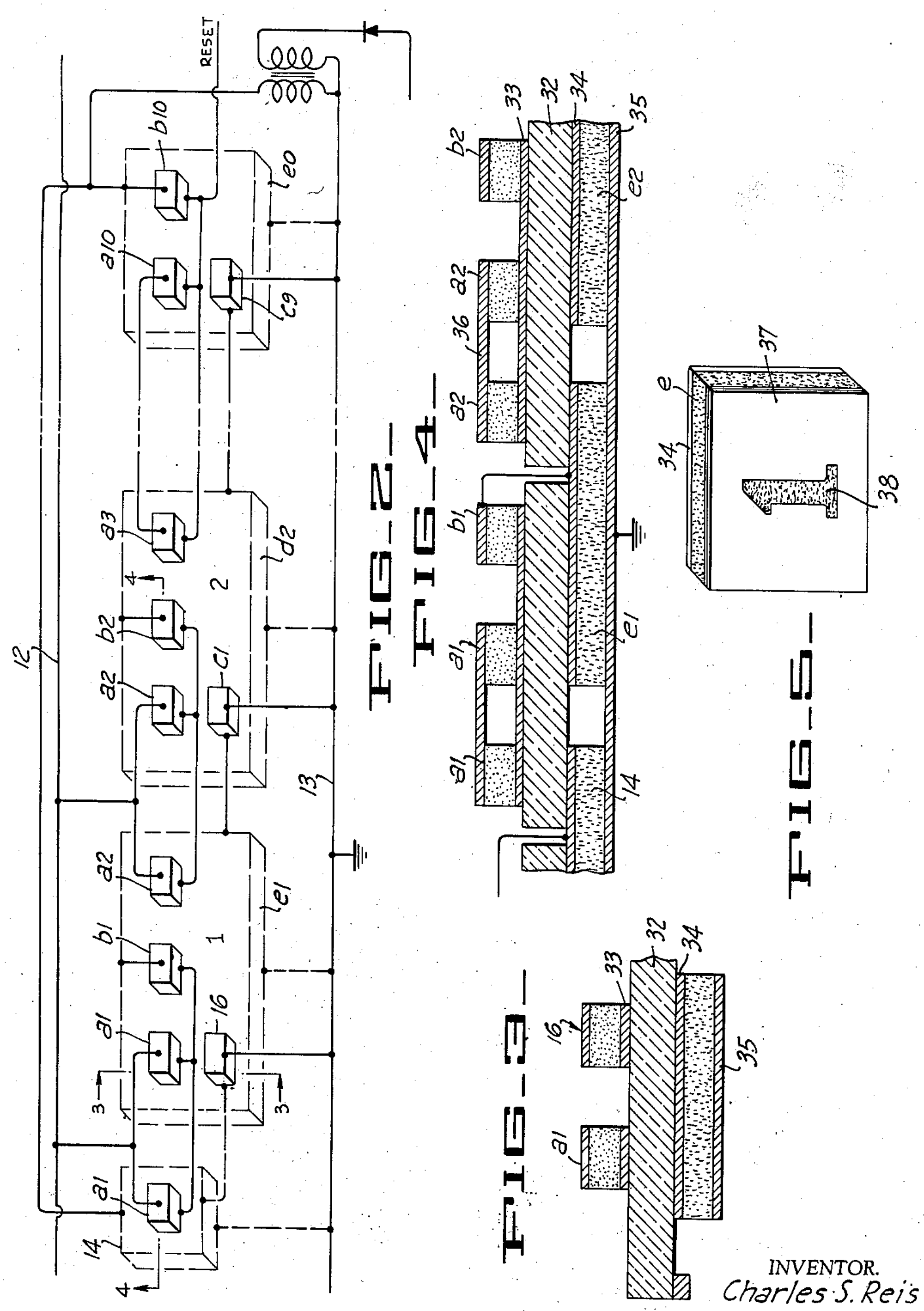
Figure 2 is a schematic diagram partly in perspective showing the physical relationship of the photoconductive and electroluminescent transducers of Figure 1.
Figure 3 is a sectional view taken along the line 3—3 of Figure 2.
Figure 4 is a sectional view taken along the line 4—4 of Figure 2.
Figure 5 is a perspective view showing numerical readout for the network.

Referring more particularly to Figures 2–4, a possible disposition of the electroluminescent and photoconductive cells of Figure 1 is shown. The network may be formed on opposite sides of a transparent insulating plate 32. Referring to Figure 2, the portions in dotted lines show elements disposed on one side of the insulating plate while the elements in solid lines show elements located on the opposite side of the plate. Transparent conductive films 33 and 34 are formed over predetermined areas of the surface of the transparent insulating plate. These films are in contact with one side of the photoconductive and electroluminescent cells associated therewith. Generally, the conductive films 34 associated with the electroluminescent material are coextensive therewith. Conductive material 35 is in contact with the other side of the electroluminescent material and forms the lead 13. The conductive films 33 associated with the photoconductive elements serve to interconnect predetermined ones of the photoconductive cells *a* and *b* of the units 11. The connections are apparent in Figure 2. Conductive material 36 is in contact with the opposite side of the photoconductive material of each cell and interconnects predetermined ones of the cells. Here again, referring to Figure 2, the interconnection is indicated.

Figure 2 illustrates the light coupling between cells and units. There is light coupling between predetermined ones of the electroluminescent cells *e* and the photoconductive cells *a*, *b* and *c*. For example, the device $a_1$ has two portions, one portion lying adjacent to the electroluminescent cell 14 and illuminated thereby, and the other portion lying adjacent the electroluminescent cell $e_1$ and illuminated thereby. The cell $b_1$ is illuminated by the electroluminescent cell $e_1$. Similarly, the cell $a_2$ has a portion which is illuminated by the electroluminescent cell $e_1$ and a portion which is illuminated by the electroluminescent cell $e_2$. The photoconductive cell $b_2$ is illuminated by the electroluminescent cell $e_2$. The photoconductive cell $c_1$ is illuminated by the electroluminescent cell $e_2$.

Thus it is seen that in each of the units 11 the cell *a* has a portion which is illuminated by the electroluminescent cell of the preceding unit 11 and a portion which is illuminated by the electroluminescent cell of its own unit. The photoconductive cell *b* of each of the units is illuminated by its own electroluminescent cell. The photoconductive cell *c* is illuminated by the electroluminescent cell of the succeeding unit 11.

Referring to Figure 5, one of the electroluminescent cells is shown. One surface includes a transparent conductive coating 34 as previously described. If the second conductive coating which forms the conductor 13 is also transparent and an opaque mask 37 applied thereto, a visual read-out may be effected. If the mask has cut out numerals 38 corresponding to the particular unit 11, then by observing the surface illumination through the mask, the count on the counter may be directly observed.

The transparent insulating plate 32 may be made of glass. Transparent conductive films may be formed on predetermined areas of the glass plate by suitably masking the glass and subjecting the exposed portions to an atmosphere of stannous chloride in a heated oven. The electroluminescent material may be applied by mixing the same in an air drying binder solution which is then sprayed onto the surface through a mask whereby it is applied to predetermined areas of the surface. The photoconductive material may likewise be applied by mixing the particles in an air drying binder and spraying the same onto predetermined areas. The outside conductors may be applied as a coating of silver paint or the like. In areas where it is desired to prevent contact between the conductors and the underlying transparent conductive layer suitable insulating material may be applied.

Operation of the network is as follows: A biasing voltage is applied between the lines 12 and 13 by the generator 26. This voltage is preferably an alternating current voltage having a frequency suitable for energizing the electroluminescent material of the cells. The amplitude of the voltage is such that it is not sufficient to energize the electroluminescent cell of any unit unless the photoconductors associated therewith have been illuminated to reduce their resistance. That is, the voltage acts merely as a bias voltage which will maintain the electroluminescent cells energized once the photoconductive cells associated therewith have been illuminated. The bias voltage also serves to raise the voltage level whereby input voltage pulses having a predetermined small amplitude will suffice to energize each of the units 11 as will be presently described.

Each of the units 11 is preconditioned by illuminating its respective photoconductive cell *a*. Generally, in a counter only the photoconductive cell *a* of the next count will be illuminated and preconditioned. As previously described, even with the cell *a* illuminated, the biasing voltage applied between the lines does not have an amplitude which is sufficient to energize the electroluminescent cell associated therewith.

The electroluminescent cell *e* of the preconditioned unit is energized by the application of a pulse between the lines 12 and 13. The pulse has an amplitude which is not sufficient to energize any of the units 11 unless the same is preconditioned by illuminating the photoconductive cell *a*. However, the amplitude is such that when combined with the bias voltage it is sufficient to energize the electroluminescent cell of the preconditioned unit.

At the start of a count cycle, a reset pulse 31 is applied to the line 30. The reset pulse serves to control the gate 28 whereby the biasing voltage is momentarily removed from the counter. Removal of the biasing voltage will extinguish the energized electroluminescent cell. The pulse is also applied across the photoconductive cell $d_0$ and electroluminescent cell $e_0$. The pulse has sufficient amplitude to energize the cells $e_0$ and 14. Thus, when the pulse is terminated, energization of the cells $e_0$ and 14 illuminates the photoconductive cells $a_1$, $a_0$ and $b_0$. When the pulse is terminated, the gate 28 is again closed and the biasing voltage applied to the counter. Since the photoconductive elements $a_0$ and $b_0$ are conducting, the biasing voltage will maintain the electroluminescent cell $e_0$ energized. The photoconductive unit $a_1$ remains illuminated to precondition the unit 11–1.

Assuming now that the pulse to be counted, having a predetermined amplitude as previously described, is applied between the lines 12 and 13. The application of the pulse will energize the electroluminescent cell $e_1$ since the unit 11–1 is preconditioned. This will serve to illuminate the photoconductive cells $a_1$, $b_1$, $a_2$ and 16. Since the cells $a_1$ and $b_1$ are illuminated their resistance is sufficiently lowered and the biasing voltage will be sufficient to maintain the cell $e_1$ energized. The illumination also strikes the photoconductive cell 16 shunted across the electroluminescent cells $e_0$ and 14. When this cell is illuminated its resistance is lowered and the cells $e_0$ and 14 are extinguished. The cell also illuminates the photoconductive cell $a_2$ of the unit 11–2 thereby preconditioning the unit whereby application of the next pulse will serve to excite the electroluminescent cell $e_2$.

Application of the next pulse will illuminate the cell $e_2$. Illumination of the cell $e_2$ will illuminate the photoconductive cells $a_2$, $b_2$, $c_1$ and $a_3$. Thus the electroluminescent cell $e_1$ is extinguished and the unit 11–3 is preconditioned whereby the next pulse will advance the count. The count may be observed by looking at the mask, Figure 5. Thus, as the count advances the numeral displayed will indicate the count.

Assuming that the count has advanced to 9, that is that the unit 11–9 is energized, the next pulse will advance the count to 0. When the count is advanced to 0, a pulse appears at the transformer 17 which is applied to the next decade counter and will shift the count from 0 to 1 indicating a tens count. Application of the next pulse will then advance the count to 11, etc. It is apparent that more decade counters may be cascaded to provide counts of tens, hundreds, thousands, etc., as desired.

When a new count is to be formed, a reset pulse is applied to the line 30 as previously described. The reset pulse serves to energize the zero count and simultaneously remove the bias voltage for a time which is sufficient to de-energize the unit which is energized.

Figure 6:
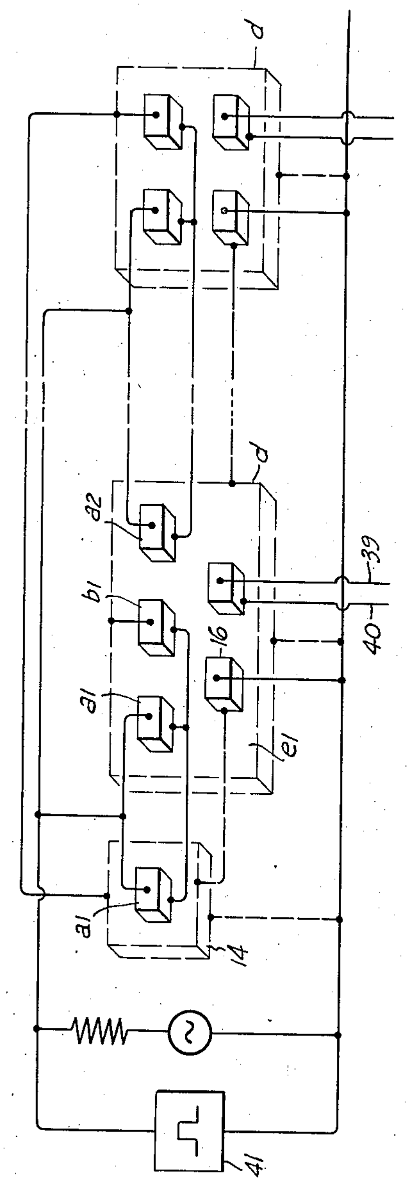
Figure 6 is a view showing a network of the type illustrated in Figure 2 together with additional photoconductive transducers which form a sequential stepping switch.

In certain applications it is desirable to have a fast response stepping switch without employing moving contacts or the like. By modifying the apparatus illustrated in Figure 1, such a stepping switch may be easily constructed. A stepping switch having any number of steps or contacts may be formed by employing a plurality of units 11 of the type illustrated in Figure 1 together with an additional photoconductive cell associated with each unit, as illustrated in Figure 6. The additional photoconductive cells are adapted to be illuminated by the electroluminescent cells *e*. Thus, as the count advances each of the cells is sequentially lit to become conductive and perform the switching operation. A pair of leads 39 and 40 is connected to opposite sides of the cell and when the cell is illuminated serves to provide a connection between the lines 39 and 40. The stepping may be performed by employing a continuous pulse generator 41 which applies pulses at predetermined frequency to sequentially step the switch. However, if it is desired to merely control the stepping in response to some other intelligence then a pulse generator which is suitably controlled from the other apparatus may be employed to perform the stepping.

Figure 7:
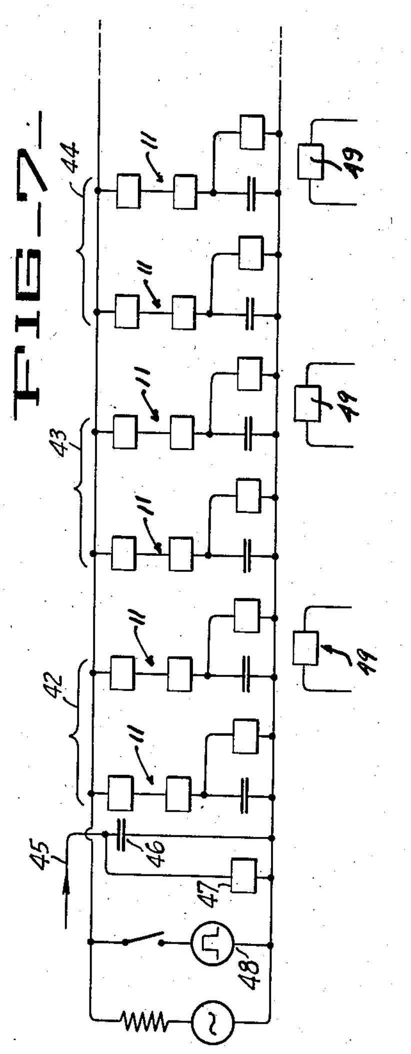
Figure 7 shows a solid state shift register.

Another modification is a shift register. The shift register will comprise a pair of units 11 to form storage elements of the shift register. Thus, referring to Figure 7, elements 42, 43 and 44 form a storage element. Each of these units is adapted to store a bit of information corresponding to zero or one. The information corresponding to zero or one is applied to the element 42 in form of pulses along the line 45. The electroluminescent cell 46 will then either be illuminated or extinguished depending upon whether the information is zero or one. The photoconductive cell 47 serves to extinguish the cell 46 when the information is transferred to the element 42. By applying pulses from a suitable pulse generator 48 to the lines 12 and 13, the information may be advanced, as described with respect to Figure 1. A read-out from each of the storage units may be performed by the photoconductive cells 49 associated with the second of the pair of units 11. Each pair of pulses generated by the pulse generator 48 will serve to shift the information from one storage element to the next. A suitable clocking mechanism and timing circuit may be employed to control the pulses 48 to thereby control the advance and storage of information in the shift register.

Thus, it is seen that I have provided an improved solid state network. The network may be employed to count and, with the addition of photoconductive cells, it may be used to perform switching operations. The network is compact, is inexpensively and easily manufactured, and reliable in operation.

I claim:

1. A solid state counter adapted to be operated in response to electrical input pulses comprising means for applying a bias voltage to the counter, a plurality of units each including first, second and third serially connected photoconductive cells and an electroluminescent cell connected in parallel with said third photoconductive cell, said units being connected in parallel between a pair of input terminals, the cells of each of said units being arranged so that the first and second photoconductive cells are illuminated by the electroluminescent cell of the same unit whereby the resistance of the unit is lowered and the electroluminescent cell is maintained energized by the bias voltage, said units being arranged whereby the first photoconductive cell is illuminated by the electroluminescent cell of a preceding unit to thereby condition the unit whereby the unit is energized in response to an input pulse and the third cell of each of said units is illuminated by the electroluminescent cell of a succeeding unit to thereby extinguish the electroluminescent cell connected in parallel therewith.

2. Apparatus as in claim 1 including reset means serving to apply reset pulses to the network, said reset pulses serving to energize the last of said units and to precondition the first of said units.

3. A solid state network of the type adapted to be operated by electrical input pulses comprising a plurality of units, each of said units including first, second and third serially connected photoconductive cells and an electroluminescent cell connected in shunt with said third cell, said units being connected in parallel between a pair of input terminals, means for applying a bias voltage to said units, said bias voltage having sufficient amplitude to energize the electroluminescent cell of each of said units if applied directly thereto, said cells and units being arranged whereby the first photoconductive cell of each unit is illuminated by the electroluminescent cell of a preceding unit to thereby condition the respective unit whereby the electroluminescent cell of said unit is energized in response to the next electrical pulse, the second photoconductive cell is adapted to be illuminated by the electroluminescent cell of its own unit whereby the cells remain illuminated by the bias voltage once it is energized, and the third photoconductive cell is adapted to be illuminated by the electroluminescent cell of a succeeding unit to thereby extinguish the electroluminescent cell, and means for applying said input pulses to said units to thereby energize conditioned ones of the electroluminescent cells.

4. Apparatus as in claim 3 including a reset means serving to reset the network in response to a reset pulse.

5. A network of the type adapted to be operated by electrical pulses comprising a plurality of units, each of said units including first, second and third serially connected photoconductive cells and a light source having a threshhold voltage above which it becomes luminant connected in shunt with the third cell, said units being connected in parallel between a pair of input terminals, said cells and units being arranged whereby the first photoconductive cell of each unit is illuminated by the light source of the preceding unit to thereby condition the respective unit whereby the light source of said unit becomes energized in response to the next electrical pulse, the second photoconductive cell adapted to be illuminated by the light source of its own unit, and the third photoconductive cell adapted to be illuminated by the light source of the succeeding unit to thereby extinguish the light source of said unit, means for applying a bias voltage to said units, said bias voltage having an amplitude greater than the threshhold voltage, and means for applying an input pulse to said units.

6. A network as in claim 5 including reset means serving to reset the network in response to a reset pulse.

References Cited in the file of this patent

Loebner: "Opto-Electronics Devices and Networks," Proc. of the Institute of Radio Engineers, December 1955, pp. 1897 to 1906.